Aug. 12, 1930.  E. B. KIJLSTRA  1,772,928
WHEEL FRAME FOR RAIL VEHICLES
Filed July 27, 1929   2 Sheets-Sheet 1
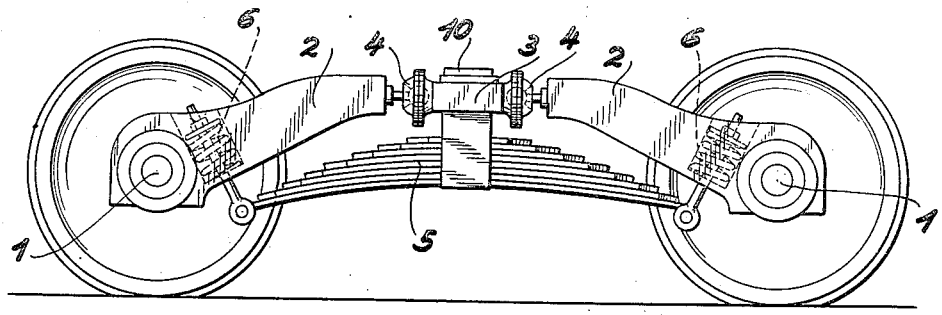
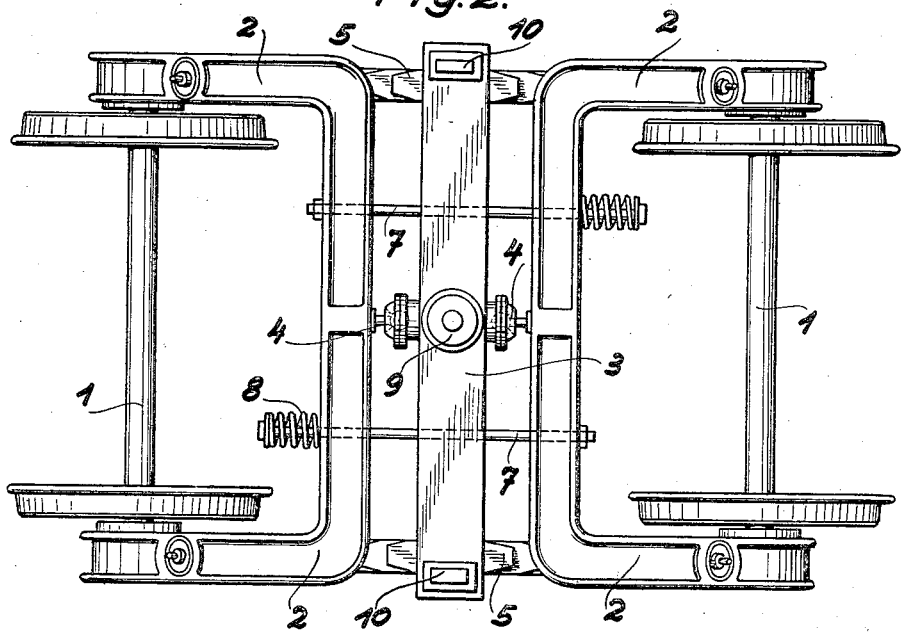
INVENTOR.
Egbert Bolleman Kijlstra,
BY Paul E. Schelling,
ATTORNEY.

Aug. 12, 1930.   E. B. KIJLSTRA   1,772,928
WHEEL FRAME FOR RAIL VEHICLES
Filed July 27, 1929   2 Sheets-Sheet 2
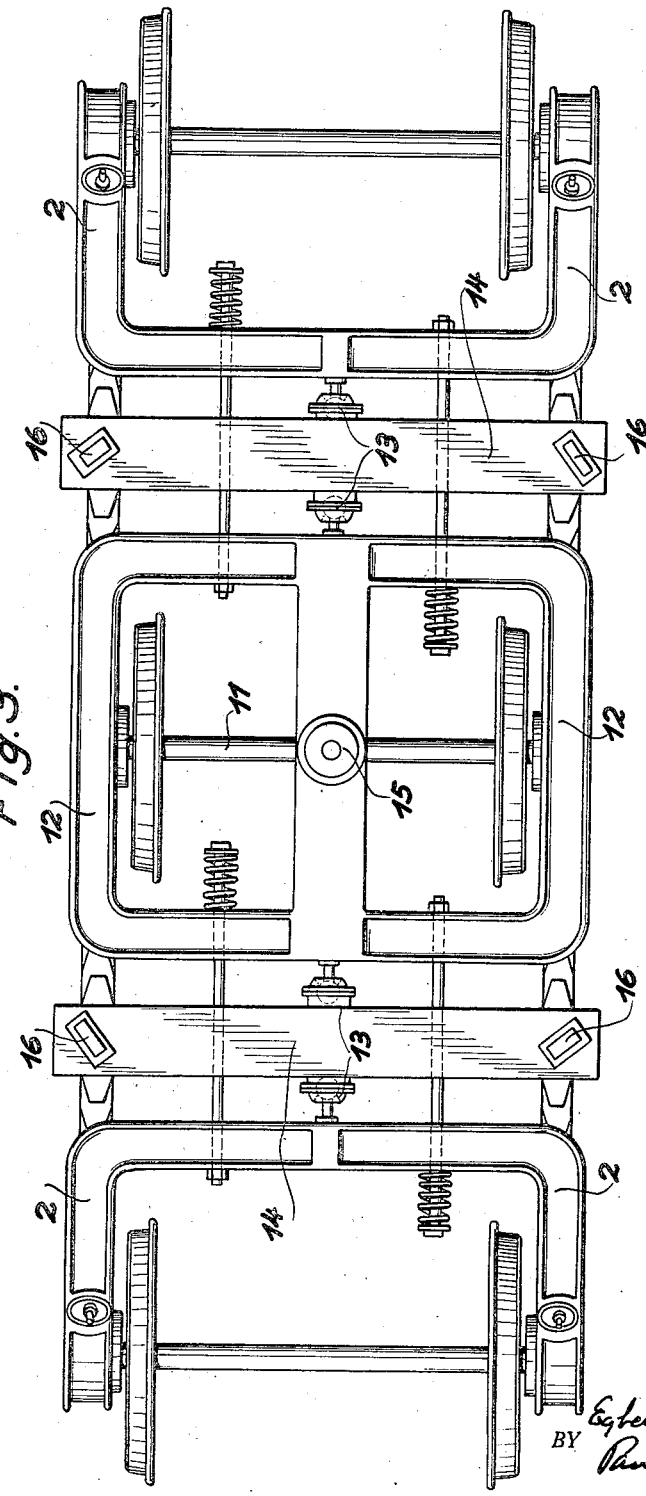
INVENTOR.
Egbert Bolleman Kijlstra,
BY Paul E. Schilling,
ATTORNEY.

Patented Aug. 12, 1930

1,772,928

UNITED STATES PATENT OFFICE

EGBERT BOLLEMAN KIJLSTRA, OF BILTHOVEN, NETHERLANDS, ASSIGNOR TO THE FIRM WAGGONFABRIK AKT.-GES., OF UERDINGEN-ON-THE-RHINE, GERMANY

WHEEL FRAME FOR RAIL VEHICLES

Application filed July 27, 1929, Serial No. 381,520, and in Germany July 27, 1928.

This invention relates to improvements in wheel supporting frames for rail-vehicles, and particularly those vehicles of this kind which are provided with four or more wheel-axles, and it is intended to provide means of insuring the parallel position of the wheel shafts, to facilitate turning and the taking of curves, and to generally facilitate the manipulation and mode of manufacture of devices of the kind referred to. Among other important objects of this invention it may be mentioned that it is distinguished from the turning frames of the previous art by the fact that it does not require any vertical guides for the shaft-collars or bushings, so as to eliminate irregular individual motion of the shaft within the frame with the additional advantageous feature that the entire frame is adapted to yield in the vertical and lateral directions. Furthermore, the centrifugal force of the vehicle frame produces an adjusting action with regard to the position of the axles relatively to the arc of the track, when the device is moving through curves. However, the arrangement is such as to allow each axle to perform those individual movements of its own which are necessary for the exact adjustment of the axles or shafts and without interfering with the smooth running of the vehicle.

The invention will now be more particularly described by reference to the accompanying drawing, showing by way of exemplification some embodiments of the principles of this invention.

In the drawings:—Figure 1 is a side view of a wheel frame for two axles, and in Figure 2 this construction is shown in plan view. Figure 3 is a plan view of an arrangement employed for a three-axled frame.

Referring particularly to Figures 1 and 2 of the drawing, it appears that each of the wheel shafts 1 is fixed in bearings of a frame 2 of substantially U-shaped configuration. Between the two frames 2 a carrier beam or support 3 is provided which is pivotally connected to the frame 2 by the ball-joints or cross-joints 4 disposed at about the middle of the carrier. On both of its sides the carrier 3 rests on the supporting springs 5 which are suspended from the frame 2 in the exemplification shown with the aid of intermediate counter-springs 6. These springs 6 are balanced relatively to each other by the bolts 7 and the coiled springs 8 which may be replaced, if desired, by a frictional spring or frictional buffers. According to another modification the members 7 and 8 may be dispensed with. Upon the carriers 3 the lateral and intermediate or central bearings or supporting means 9, 10 for the vehicle-frame, coach or the like, are arranged to be oscillatingly disposed with relation to the carrier 3.

In the normal condition the shafts 1 are in parallel relation to each other. When a deviation of one of the axles is produced by warping or other irregularities of the rails or by other causes, this shaft or axle will turn on the center of the corresponding link joint, or the like, 4, with the result that in case of horizontal movements of the axle the inclinations of the shackle of the supporting springs are altered, while the springs 8 are respectively tensioned or relieved. Both of these actions produce a reaction or a tendency of counter-movement and tend to restore the axle or shaft 1 to its original position. However, this action necessitates the overcoming of a frictional resistance set up by the engagement of the wheels with the rails and causing a braking action which opposes the movement of the shaft and produces the damping of the oscillating impulses. Moreover each of the shafts or axles operates like a free guiding axle, that is to say, that this axle will absorb all horizontal shocks and jars produced from one side only upon this axle and spring actingly absorbed thereby. As a result of this manner of operation quiet and smooth running will be insured. When moving through curves the centrifugal force will have a positive adjusting action in regard to the position of the axles, so as to cause them to assume a radial or approximately radial position relatively to the arc of the curve, by which means very quiet movement, a minimum air resistance and a very great reduction of wear on the turning frame are produced.

In a modification the frames 2 may be directly connected by the joint 4, while the carrier 3 is entirely dispensed with. The vehicle frame is then caused to rest upon the frame 2 or upon the joints 4 by means of frictional discs or friction-sockets, while the frame 2 is supported upon the supporting springs.

In the case of a three-axled arrangement of the wheel-frame, as shown in Figure 3 of the drawing the central shaft 11 is journalled in a laterally closed frame 12 which is connected by the joints 13 to the carriers 14 at both sides of the frame 11, and to the exterior frames 2. The parts 12, 14 are provided with the supporting means 15, 16 for the vehicle frame or coach. The arrangement of the other parts and the mode of operation are the same as those described with relation to the modification hereinbefore described. With this arrangement according to Figure 3 the frames 2 and 12 may likewise be directly connected by means of the joints 13.

It should, of course, be understood that the invention is not to be limited to the particular modifications and exemplifications herein described and shown by way of illustration of its principles but it may find expression in other embodiments, and it is susceptible of other modifications and changes to adapt the invention to varying conditions, and within the meaning of the claims hereunto appended.

I claim:—

1. Wheel-axle frame particularly for rail-vehicles and comprising spacedly arranged wheel supporting frame members, wheel axles on said members, and spring-controlled joints between and articulately connecting said frame members, and to which said frame members are symmetrically connected.

2. Wheel axle frame, comprising oppositely and confrontingly disposed, substantially similar wheel-axle holding means and connecting joints intermediate the holding means and to which said means are symmetrically connected, and additional, oppositely directed spring acting holding means connecting the wheel-axle holding means and disposed on opposite sides of the joints.

3. Wheel axle frame, comprising oppositely and confrontingly disposed, substantially similar wheel-axle holders, a spring supported carrier intermediate the holders, and a universal joint between said carrier and holders symmetrically connected to the holders.

4. Wheel axle frame, comprising oppositely and confrontingly disposed, substantially similar wheel-axle holders, a carrier intermediate said holders, pivotal connecting means on the carrier to which the holders are symmetrically connected, a supporting compound spring at the bottom of the carrier, and spring-actuated link-connection between the ends of the compound spring and the holders, and additional, oppositely directed, substantially parallel spring-actuated holding means between the holders on both sides of the carrier.

5. Wheel-axle frame, comprising a pair of frame members, a central carrying beam, a wheel-axle carried by each frame member, pivotal connecting means on opposite sides of the frame members and connecting the same with the beam, spring connections between the beam and the frame members linked to the latter, and elastic controlling connections between the beam and frame members on opposite sides of said pivotal connecting means.

6. Wheel axle-frame comprising a central carrier, car-frame supporting means on said carrier, substantially similar wheel-axle holders symmetrically disposed on opposite sides of the carrier, pivotal, link-like connecting means between the carrier and the holders, and spring supporting means for the carrier, endwise linked to the holders.

7. In a wheel frame for vehicles, a pair of rigid independent frame members, wheel carrying axles supported by said members, a joint connection between the members permitting relative vertical and lateral articulating movements thereof, and spring connections between the members elastically supporting each from the other and yieldingly opposing the relative vertical and lateral movements thereof.

8. In a wheel frame for vehicles, a pair of independent rigid wheel carrying frame members, a transverse beam arranged between said frame members, springs suspended from the beam at the opposite sides of the wheel frame and elastically jointed to the adjacent sides of the wheel carrying frame members, a jointed connection between the beam and each wheel carrying frame member permitting vertical and transverse articulating movements of the latter, and elastic connections between the frame members on opposite sides of the jointed connection for yieldingly opposing relative movements of the frame members.

9. In a wheel frame for vehicles, a pair of rigid independent wheel carrying frame members, a transverse beam disposed between said frame members, a longitudinally extending leaf spring suspended from the beam at each side of the wheel frame and elastically jointed to the adjacent sides of the wheel carrying frame members, a joint connection between the frame members and the beam permitting vertical and lateral articulating movements of said frame members, and elastic connections between the frame members on opposite sides of said joint connection and opposing the articulating movements thereof.

10. In a wheel frame for vehicles, rigid wheel carrying frame members, a beam between said frame members, longitudinally extending springs supported by the beam and elastically connected at their ends to the sides of the frame members, a universal joint connection between each frame member and the beam permitting relative vertical and lateral articulating movements of the frame members, and longitudinally extending elastic connections between the frame members at opposite sides of the universal joint connection for yieldingly restricting such movements.

11. In a wheel axle frame, a pair of rigid substantially U-shaped wheel carrying frame members, a transversely disposed beam arranged between said frame members, longitudinally extending leaf springs suspended from the beam and elastically jointed at the sides of the frame to the frame members, a universal joint connection between each frame member and the beam permitting relative vertical and lateral articulating movements of the frame members, and elastic controlling connections between the frame members on opposite sides of the joint yieldingly opposing the relative movements of the frame members.

In testimony whereof I affix my signature.

EGBERT BOLLEMAN KIJLSTRA.